United States Patent
Li et al.

(10) Patent No.: US 7,031,406 B1
(45) Date of Patent: Apr. 18, 2006

(54) INFORMATION PROCESSING USING A SOFT OUTPUT VITERBI ALGORITHM

(75) Inventors: Bin Li, Ottawa (CA); Wen Tong, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/370,178

(22) Filed: Aug. 9, 1999

(51) Int. Cl.
H04L 27/06 (2006.01)

(52) U.S. Cl. .................. 375/341; 375/233; 375/262; 375/265; 714/792; 714/794; 714/795

(58) Field of Classification Search ........... 375/341, 375/233, 242, 285, 262, 265; 714/786, 755, 714/792–796

See application file for complete search history.

(56) References Cited

U.S. PATENT DOCUMENTS

| | | | |
|---|---|---|---|
| 4,500,994 A | 2/1985 | McCallister et al. | 371/43 |
| 4,933,956 A | 6/1990 | Forney, Jr. | 375/94 |
| 5,181,209 A | 1/1993 | Hagenauer et al. | 371/43 |
| 5,208,816 A | 5/1993 | Seshardi et al. | 371/43 |
| 5,390,198 A | 2/1995 | Higgins | 371/43 |
| 5,432,803 A | 7/1995 | Liu et al. | 371/43 |
| 5,461,644 A | 10/1995 | Bergmans et al. | 375/341 |
| 5,537,444 A | 7/1996 | Nill et al. | 375/341 |
| 5,550,870 A * | 8/1996 | Blaker et al. | 375/341 |
| 5,721,745 A * | 2/1998 | Hladik et al. | 714/755 |
| 5,784,392 A | 7/1998 | Czaja et al. | 371/43.5 |
| 6,389,574 B1 * | 5/2002 | Belveze et al. | 714/795 |

OTHER PUBLICATIONS

Hoeher, "TCM on Frequency-Selective Fading Channels:a Comparison of Soft-Output Probabilistic Equalizers", GLOBECOM '90, IEEE.*

"Optimal Decoding of Linear Codes for Minimizing Symbol Error Rate", L.R. Bahl et al., IEEE Transactions on Information Theory, vol. IT-20, pp. 284-287, Mar. 1974.

"A Viterbi Algorithm With Soft-Decision Outputs and Its Applications", J. Hagenauer and P. Hoeher, Proceedings of GLOBECOM '89, pp. 1680-1686, Nov. 1989.

"The Viterbi Algorithm", G. D. Forney, Proceedings of the IEEE, vol. 61, No. 3, pp. 268-278, Mar. 1973.

"A Comparison of Optimal and Sub-Optimal MAP Decoding Algorithms Operating in the Log Domain", P. Robertson et al., Proceedings of International Conference on Communications '95, pp. 1009-1013, Jun. 1995.

* cited by examiner

*Primary Examiner*—Khai Tran
*Assistant Examiner*—Edith Chang
(74) *Attorney, Agent, or Firm*—Dennis R. Haszko; Borden Ladner Gervais LLP

(57) ABSTRACT

A SOVA decoding method determines, for each information symbol time and each state of a decoding trellis, a vector of probabilities for each possible symbol value in accordance with transition path probabilities for reaching the state with respective information symbol values and probability vectors for the states at the previous information symbol time from which the state can be reached, and also determines a total probability for each state. A soft output is provided by summing probabilities for corresponding symbol values all states of the trellis at an information symbol time relating to the start of the vectors, corresponding to a desired survivor path length. The vectors can comprise probability ratios instead of probabilities to reduce storage especially for binary signal decoding, and logarithmic probabilities or ratios can be used to simplify computation.

13 Claims, 2 Drawing Sheets

INFORMATION PROCESSING USING A SOFT OUTPUT VITERBI ALGORITHM

This invention relates to information processing using a soft output Viterbi algorithm, also referred to as SOVA.

Typically, the information processing comprises decoding of an encoded signal in the form of information symbols received via a communication channel, and it is in this context that the invention is described and explained in detail below. However, it can be appreciated that, as is well known in the art, the information processing can instead or additionally include demodulation of a modulated signal, equalization, decoding of a signal recovered from a storage medium on which an encoded signal has been stored, speech recognition, and so on. More generally, the information processing can include any application in which a SOVA is useful.

For brevity and convenience, the information symbols and signals are referred to below as data symbols and signals, it being understood that the term "data" as used herein embraces any form of information.

BACKGROUND OF THE INVENTION

In the context of communication of information over a communications channel, such as a wireless channel in a cellular communications systems, it is well known to encode a signal for transmission and to recover the signal by complementary decoding of received data symbols. As indicated above, similar techniques can be used for example for storage of signals on a storage medium.

A convolutional code can be used for such encoding. An (n,k,m) convolutional code provides from k data symbols and m previous data symbols an encoded word of n symbols; it is referred to as a rate k/n code with a constrain length K=m+1 and can be implemented using a coder with m memory stages. A systematic convolutional code is one in which the n symbols of the encoded word directly include the k data symbols to be encoded and n-k error correction symbols. One of the most promising error-correcting coding methods is so-called turbo coding, which uses two relatively simple systematic convolutional coders operating on relatively interleaved data symbols.

An effective method of encoding convolutionally coded data symbols is maximum likelihood (ML) decoding, which involves finding for a received sequence of data symbols an error-free signal sequence that is most likely to have produced the received sequence.

Various forms of ML decoder are known, including maximum a posteriori (MAP) and SOVA decoders, each of which can be implemented with a variety of forms and variations. MAP decoders generally provide the best performance, but involve both forward and backward computation for states in a decoding trellis, so that they result in an undesirable relatively large decoding delay. SOVA decoders involve only forward computation for the decoding trellis states, so that they generally have a smaller decoding delay which is desirable for delay-constrained applications, but their performance is generally inferior to that of MAP decoders.

Accordingly, it would be desirable to provide a ML decoder that has a decoding delay similar to that of a SOVA decoder and a performance similar to that of a MAP decoder.

An object of this invention is to provide an improved method of information processing using a SOVA.

SUMMARY OF THE INVENTION

One aspect of this invention provides a method of processing information using a soft output Viterbi algorithm (SOVA), comprising the steps of: iteratively for successive information symbol times, for each of a plurality of possible states of a trellis, each state being reachable via a plurality of possible transition paths in the trellis associated with respective symbol values: determining a probability of reaching the state via each transition path, and a total probability of reaching the state; and providing at least one vector of probabilities for respective symbol values for reaching the state by summing, for each element of the vector, products of the probability of reaching the state via the respective paths with respective elements of vectors provided for previous states from which the state can be reached via the respective paths; and providing a probability for each information symbol from respective elements of said at least one vector for all of the possible states of the trellis for a respective symbol time.

In particular embodiments of the invention in which the symbol values represent binary values, said at least one vector of probabilities for respective symbol values can comprise a vector of probability ratios for said binary values, or two vectors of probabilities, one for each of the binary values, and the probability ratios or probabilities can be in the logarithmic domain for ease of calculation.

Another aspect of this invention provides a method of decoding q-ary encoded information symbols where q is a plural integer, comprising the steps of: providing, for each possible state of a decoding trellis at an information symbol time, q probability vectors for reaching the state via a path of $\delta$ information symbols of the trellis, and a total probability of reaching the state, and updating the vectors and total probability for each state at a next information symbol time by the steps of: determining a probability for each of q possible transition paths from a state at said one information symbol time to the state at said next information time; determining the total probability of reaching the state at said next information symbol time from the probabilities of the q possible transition paths to said state at said next information symbol time; and for each of q possible information symbol values at each state at said next information symbol time, merging respective probability vectors for states at said one information symbol time in accordance with the respective probabilities of the transition paths from such states at said one information symbol time to the state at said next information symbol time; and determining a probability for an information symbol $\delta$ information symbols before said next information symbol time from respective elements of said probability vectors for all of the possible states at a respective information symbol time.

A further aspect of the invention provides a method of decoding encoded binary information symbols comprising the steps of: updating for successive symbol times at vector of logarithmic probability ratios for each state of a decoding trellis at a respective symbol time, each vector corresponding to a survivor path through the decoding trellis, each logarithmic probability ratio representing in a logarithmic domain a ratio of the relative probabilities of the symbol representing a binary one or a binary zero, the updating comprising: determining probabilities for reaching each state via respective transition paths corresponding to binary one and zero values of the information symbols from respective states at a previous symbol time; combining said probabilities to determine total probability of reaching the state; and for binary one and zero information symbol values at each state, merging respective probability vectors for the respective states at said previous information symbol time in accordance with the respective probabilities of the transition paths from such states; and determining a probability ratio for an information symbol at the start of the survivor path from elements of the vectors for all of the possible states of the decoding trellis at a respective information symbol time.

Another aspect of the information provides a method of decoding encoded binary information symbols comprising the steps of: updating for successive symbol times two vectors of logarithmic probabilities for each state of a decoding trellis at a respective symbol time, each vector corresponding to a survivor path through the decoding trellis, each logarithmic probability of the two vectors representing in a logarithmic domain a probability of the symbol representing a binary one or a binary zero respectively, the updating comprising: determining probabilities for reach each state via respective transition paths corresponding to binary one and zero values of the information symbols from respective states at a previous symbol time; combining said probabilities to determine total probability of reaching the state; and for binary one and zero information symbol values at each state, merging respective probability vectors for the respective states at said previous information symbol time in accordance with the respective probabilities of the transition paths from such states; and determining a probability ratio for an information symbol at the start of the survivor path from elements of the vectors for all of the possible states of the decoding trellis at a respective information symbol time.

The above methods can further include the step of, for each information symbol time, normalizing the total probabilities for all of the states.

The invention also provides a decoder arranged to carry out any of the above methods.

BRIEF DESCRIPTION OF THE DRAWINGS

The invention will be further understood from the following description with reference to the accompanying drawings, in which.

DETAILED DESCRIPTION

Figure 1:
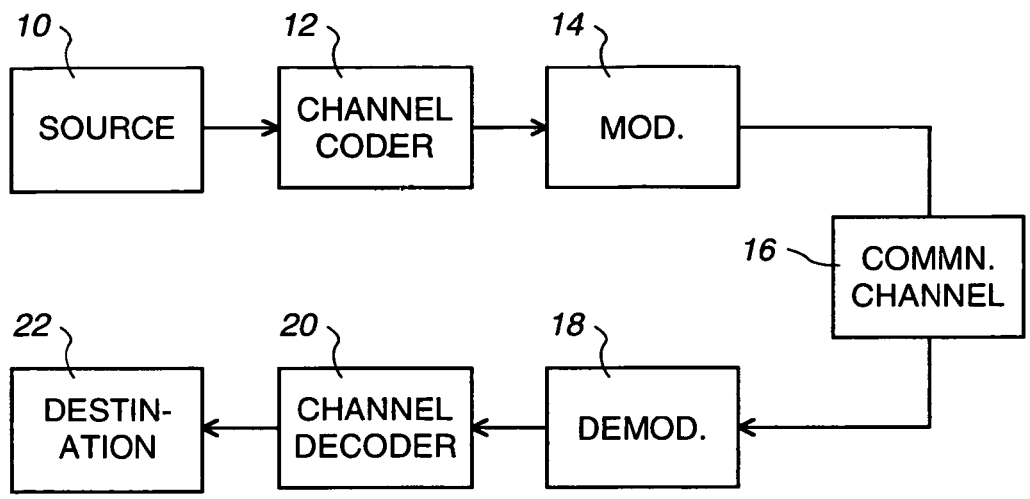
FIG. 1 schematically illustrates in a block diagram a general form of a known communications system including a channel coder and decoder.

Referring to the drawings, FIG. 1 illustrates in a block diagram a general form of a known communications system. An information source 10 supplies a digital signal sequence to a channel coder 12, which supplies a resulting encoded signal sequence to a modulator 14. The modulator 14 produces, in accordance with any desired modulation method, a resulting modulated signal which is transmitted via a communications channel 16 to a demodulator 18. The demodulator 18 produces a demodulated signal sequence which is supplied to a channel decoder 20. An output of the channel decoder 20 ideally corresponds exactly to the digital signal sequence supplied by the information source 10, and is supplied to a destination 22.

As is well known, the communications channel 16 introduces to the transmitted signal various impairments such as noise, fading, and interference, and the channel coding is intended to make it easier to recover the information sequence from the received signal sequence in the presence of such impairments. To this end, the coder 12 is typically a convolutional coder and the decoder 20 is typically a ML decoder preferably providing soft decisions (probabilities, or probability ratios) as described further below. The demodulator 18 may also operate to provide soft demodulation decisions, and iterative techniques may be used in the decoder 20 and/or demodulator 18 in order to enhance the soft decisions reached. Such iterative techniques, and other or related techniques such as interleaving and use of concatenated encoding for example as in turbo coding referred to above, may also be used and are known in the art and accordingly are not further described here.

As mentioned above, the ML decoder 20 can typically be a MAP decoder or a SOVA decoder. For example, a MAP decoder can use the so-called BCJR algorithm known from "Optimal Decoding of Linear Codes for Minimizing Symbol Error Rate" by L. R. Bahl et al., IEEE Transactions on Information Theory, vol. IT-20, pages 248–287, March 1974. A SOVA decoder can be in a form known from "A Viterbi Algorithm with Soft-Decision Outputs and its Applications" by J. Hagenauer and P. Hoeher, Proceeding of GLOBECOM '89, pages 1680–1686, November 1989, which applies soft decisions to the Viterbi algorithm known for example from "The Viterbi Algorithm" by G. D. Forney, Proceedings of the IEEE, Volume 61, No. 3, pages 268–278, March 1973. Any such detector is conveniently arranged to operate in the log domain to facilitate the processing f exponential functions, as explained in "A Comparison of Optimal and Sub-Optimal MAP Decoding Algorithms Operating in the Log Domain" by P. Robertson et al., Proceedings of International Conference on Communications '95, pages 1009–1013, June 1995. This Robertson publication indicates comparative performances of such decoders, for example concluding that at a bit error rate (BER) of $10^{-4}$ a SOVA decoder for a turbo code is about 0.7 dB inferior to a MAP decoder.

For example, the channel coder 12 in FIG. 1 can comprise a convolutional coder producing in each encoded word two output or transmitted information bits dependent on one input bit and for example m=2 preceding bits, constituting a rate ½ coder with a constraint length of K=3.

Figure 2:
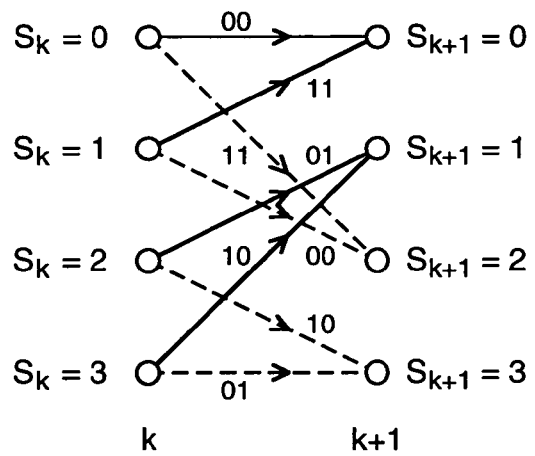
FIG. 2 illustrates one segment of a decoding trellis for a rate ½ convolutional code, as is known in the art.

FIG. 2 illustrates one segment of a decoding trellis for such a convolutional code. In conventional manner in FIG. 2, circles or nodes of the trellis represent coding states at two successive symbol time intervals k and k+1, and lines between the nodes represent all possible transitions from any state at the time k to a state at the time k+1, solid and dashed lines corresponding to an information bit of 0 and 1 respectively. As the convolutional code is of memory m=2, there are four possible states at each time, numbered 0 to 3. References $S_k$ and $S_{k+1}$ indicate states at the times k and k+1 respectively. A pair of bits adjacent each transition line indicate the transmitted encoded bits represented by the transition.

As explained in the Robertson publication referred to above, a MAP decoder (or a Log-MAP decoder, which is a MAP decoder implemented in the log domain) takes into consideration all paths through the decoding trellis, splitting them into two sets depending on whether an information bit under consideration in a current step is 1 or 0, and providing a log-likelihood ratio (LLR) of these two sets. The Robertson publication also describes a Max-Log-MAP decoder that looks at only two paths per step, namely the best path with an information bit 1 and the best path with an information bit 0, and provides a difference of the log-likelihoods for these two paths.

In contrast, as also explained in the Robertson publication, a SOVA decoder provides a ML path and considers only one competing path per decoding step. A list output or generalized Viterbi algorithm (LVA or GVA) is also known, for example from Nill et al. U.S. Pat. No. 5,537,444 issued Jul. 16, 1996 and entitled "Extended List Output and Soft Symbol Output Viterbi Algorithms", in which the Viterbi algorithm (VA) is extended to provide a list of the best two or more paths, rather than only single best path.

A basic difference between the MAP and VA types of ML decoding is that the MAP types of decoding are essentially block-oriented, performing forward and backward calculations on a block of received symbols, resulting in a significant decoding delay, whereas the VA types of decoding perform computation in the forwards direction only, reducing the decoding delay. Consequently, in the case of a convolutional code used for continuous data transmission, VA types of decoding operate on a finite moving window of received symbols of length $\delta$, referred to as the survivor path length. As described below, the present invention provides a VA type of decoding, and more specifically a modified SOVA decoding, using only forwards computation and hence providing reduced decoding delay, while improving the decoding performance in comparison to known SOVA decoders.

Figure 3:
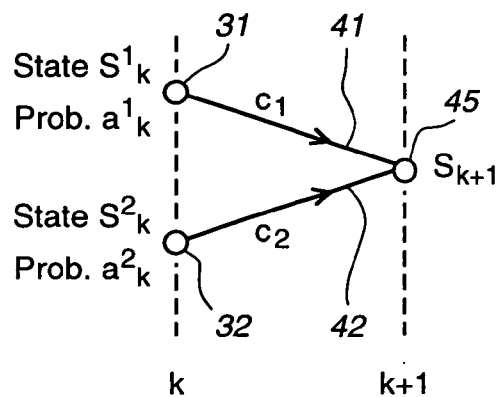
FIG. 3 illustrates parts of a decoding trellis in a general form in a manner useful for understanding the present invention.

For assistance in understanding the following description, FIG. 3 illustrates a part of one segment of a decoding trellis in a general form; it can be appreciated from a comparison of FIG. 3 with FIG. 2 that each segment of a decoding trellis is made up of a plurality of such parts, one for each possible coding state, and that an overall decoding trellis is constituted by successive segments over the window of length $\delta$. It can also be appreciated that as described below FIG. 3 provides two paths corresponding to the two possible values of a binary signal, and that FIG. 3 and the following description can be extended to q paths for a q-ary signal. For convenience and simplicity the following description relates to the linear domain, and it will be understood that the actual decoding process calculations can instead and more easily be effected in the log (logarithmic) domain, as is known in the art of ML decoding.

Referring to FIG. 3, this illustrates two nodes 31 and 32 of a segment of a decoding trellis at a time k, with transition paths 41 and 42 respectively to a node 45 of the decoding trellis at a time k+1. The node 31 represents a coding state $S^1$ which at the time k is denoted $S^1_k$, and a $a^1_k$ denotes a probability of this state being reached at this time k. Similarly, the node 32 represents a coding state $S^2$ which at the time k is denoted $S^2_k$, and $a^2_k$ denotes a probability of this state being reached at this time k. A transition probability from the node 31 via the path 41 to the node 45 is denoted $c_1$, and a transition probability from the node 32 via the path 42 to the node 45 is denoted $c_2$. The node 45 represents a coding state S which at the time k+1 is denoted $S_{k+1}$. It can be appreciated that the selection of the nodes 31, 32, and 45, apart from the fact that they are linked by the paths 41 and 42, is relatively arbitrary, and that corresponding parameters can be applied to all of the nodes and paths in each segment of the decoding trellis.

The present decoding method iteratively updates, from each symbol time k to the next symbol time k+1, vectors of probabilities or probability ratios for the coding states or nodes of the decoding trellis at the respective symbol time. Each vector has a number of elements corresponding to a decoding window or survivor path length of $\delta$ symbols. With updating of the vectors from one symbol time to the next, the oldest elements of the vectors are used to provide a soft output, i.e. a set of probabilities or at least one probability ratio, of the decoder for the oldest information symbol of the window, to which these oldest elements relate, so that the decoding process has a decoding delay of $\delta$ symbols. The process does not involve any backwards computation, but only an updating of parameters, or metrics, with each symbol and a final determination of the soft output.

FIG. 3 illustrates two transition paths 41 and 42 reaching the node 45, as is the case for decoding of binary symbols as described in greater detail below. For binary decoding, there can be two probability vectors, each associated with a respective binary value, for each node of the trellis, as is described below. Alternatively, and more desirably because it substantially halves requirements for storage of the vectors, the two probability vectors for each node can be replaced by one vector of probability ratios for the respective binary values. This can be extended in a similar manner to the decoding of q-ary symbols, for which there would be q transition paths incoming to each coding state or node at each symbol time, corresponding to q possible values of each information symbol being decoded. In this case there can be q probability vectors, each associated with a respective one of the q values, for each node of the trellis. Alternatively, these q probability vectors can be replaced by q-1 vectors of probability ratios. It can thus be seen that binary decoding is a particular case of q-ary decoding for which q=2, and that the decoding process is generally applicable to any integer value of q of 2 or more.

Thus considering, for simplicity, binary decoding with storage of probabilities (rather than probability ratios) in the linear domain, the present decoding method associates two probability vectors, or survivor paths, with each coding state or trellis node, the probability vectors relating to the two possible binary values of the information symbol or bit by which the respective state is entered. For the state $S^1_k$ in FIG. 3, these probability vectors are represented as:

$$\{p(u^1_{k-\delta}=0), p(u^1_{k-\delta+1}=0), \ldots, p(u^1_k=0)\}$$

$$\{p(u^1_{k-\delta}=1), p(u^1_{k-\delta+1}=1), \ldots, p(u^1_k=1)\}$$

where p denotes a probability and $u^1_j$ is the information bit estimate for values of j from k–$\delta$ to k, $\delta$ being the window or survivor path length as indicated above. Similarly, for the state $S^2_k$, these probability vectors are represented as:

$$\{p(u^2_{k-\delta}=0), p(u^2_{k-\delta+1}=0), \ldots, p(u^2_k=0)\}$$

$$\{p(u^2_{k-\delta}=1), p(u^2_{k-\delta+1}=1), \ldots, p(u^2_k=1)\}$$

where again p denotes a probability and $u^2_j$ is the information bit estimate for values of j from k–$\delta$ to k.

For the state $S_{k+1}$, the present decoding method provides two probability vectors in accordance with the following steps:

1. For the path 41:

(a) Compute the probability $a^1_{k+1}$ that state $S_{k+1}$ is reached via this path as:

$$a^1_{k+1} = c_1 a^1_k$$

(b) Extend the two probability vectors associated with the state $S^1_k$ for the state $S_{k+1}$ (i.e. add to each probability vector a further element $p(u^1_{k+1}=0)$ or $p(u^1_{k+1}=1)$ respectively) in dependence upon the information bit $u_{k+1}$ associated with the path 41 as follows:

If $u_{k+1}=1$, then set $p(u^1_{k+1}=1)=a^1_k$ and $p(u^1_{k+1}=0)=0$;
If $u_{k+1}=0$, then set $p(u^1_{k+1}=1)=0$ and $p(u^1_{k+1}=0)=a^1_k$.

This can be done for example by initializing both $p(u^1_{k+1}=1)$ and $p(u^1_{k+1}=0)$ to zero, and then setting one of them to $a^1_k$ depending upon the information bit $u_{k+1}$.

2. Similarly, for the path 42:

(a) Compute the probability $a^2_{k+1}$ that state $S_{k+1}$ is reached via this path as:

$$a^2_{k+1} = c_2 \, a^2_k$$

(b) Extend the two probability vectors associated with the state $S^2_k$ for the state $S_{k+1}$ (i.e. add to each probability vector a further element $p(u^2_{k+1}=0)$ or $p(u^2_{k+1}=1)$ respectively) in dependence upon the information bit $u_{k+1}$ associated with the path 42 as follows:

If $u_{k+1}=1$, then set $p(u^2_{k+1}=1)=a^2_k$ and $p(u^2_{k+1}=0)=0$;
If $u_{k+1}=0$, then set $p(u^2_{k+1}=1)=0$ and $p(u^2_{k+1}=0)=a^2_k$.

This can be done for example by initializing both $p(u^2_{k+1}=1)$ and $p(u^2_{k+1}=0)$ to zero, and then setting one of them to $a^2_k$ depending upon the information bit $u_{k+1}$ associated with the path 42.

3. For the state $S_{k+1}$, calculate the two probability vectors in accordance with:

(a) $p(u_i=1) = c_1 \, p(u^1_i=1) = c_2 \, p(u^2_i=1)$ for values of i from k−δ to k+1. This effectively merges the two probability vectors associated with each of the previous states (at the time k) from which the current state $S_{k+1}$ can be reached, in accordance with the respective paths and corresponding binary values. The LLR is determined as described below for the information bit $u_{k-\delta}$, for which the probabilities are subsequently dropped from the probability vectors to retain the desired window or survivor path length δ.

(b) Calculate the total probability $a_{k+1}$ of reaching the state $S_{k+1}$ as:

$$a_{k+1} = a^1_{k+1} + a^2_{k+1}$$

The above steps for the state $S_{k+1}$ are repeated in a similar manner for all of the other states at the time k+1, thereby updating metrics for all of the nodes of the decoding trellis for the time k+1.

To provide a probability of one for the sum of probabilities over all of the states or nodes in the decoding trellis at the time k+1, the probabilities over all of the states at the time k+1 are desirably normalized. This normalized ensures that the magnitudes of the probabilities do not increase or decrease inconveniently over time. However, the normalization is not essential to the operation of the method, and can conceivably be omitted.

A soft output (probability ratio) is determined for the information bit at the time k−δ, in the form of a log-likelihood ratio $LLR(u_{k-\delta})$, in accordance with the equation:

$$LLR(u_{k-\delta}) = \log \frac{\sum_{\text{all } S_m} p(u_{k-\delta}=1, S_m)}{\sum_{\text{all } S_m} p(u_{k-\delta}=0, S_m)}$$

As can be appreciated from this equation, this is a log of a ratio of the sum of probabilities for all states $S_m$ that the bit $u_{k-\delta}$ is a binary 1 to the sum of probabilities for all states $S_m$ that the bit $u_{k-\delta}$ is a binary 0, determined after a decoding delay of δ.

The above steps relate to the time k+1, and are repeated for each successive data symbol or information bit to be decoded.

Extending the above description to q-ary symbols, it can be seen that each state would have q probability vectors associated with it and be reachable via q paths; accordingly step 3(*a*) above would provide a merging of 2*q* probability vectors into q probability vectors in accordance with the q respective path probabilities. In this case also the soft output can be in the form of a relative probability for each of the q (q>2) possible values, rather than a LLR for only two binary values.

Accordingly, the steps described above can be summarized by the following steps, which are numbered in parentheses at the left to indicate corresponding blocks in FIG. 4 as discussed below:

(50) For each symbol time:

(51) . . . For each state

(52) . . . For each path entering the state

(53) . . . Determine probability of entering state via path

(54) . . . For each symbol value

(55) . . . Extend probability vector for current symbol

(56) . . . Merge probability vectors for current symbol

(57) . . . Normalize over all states for current symbol time (optional)

(58) . . . Determine soft output for symbol time δ earlier.

Figure 4:
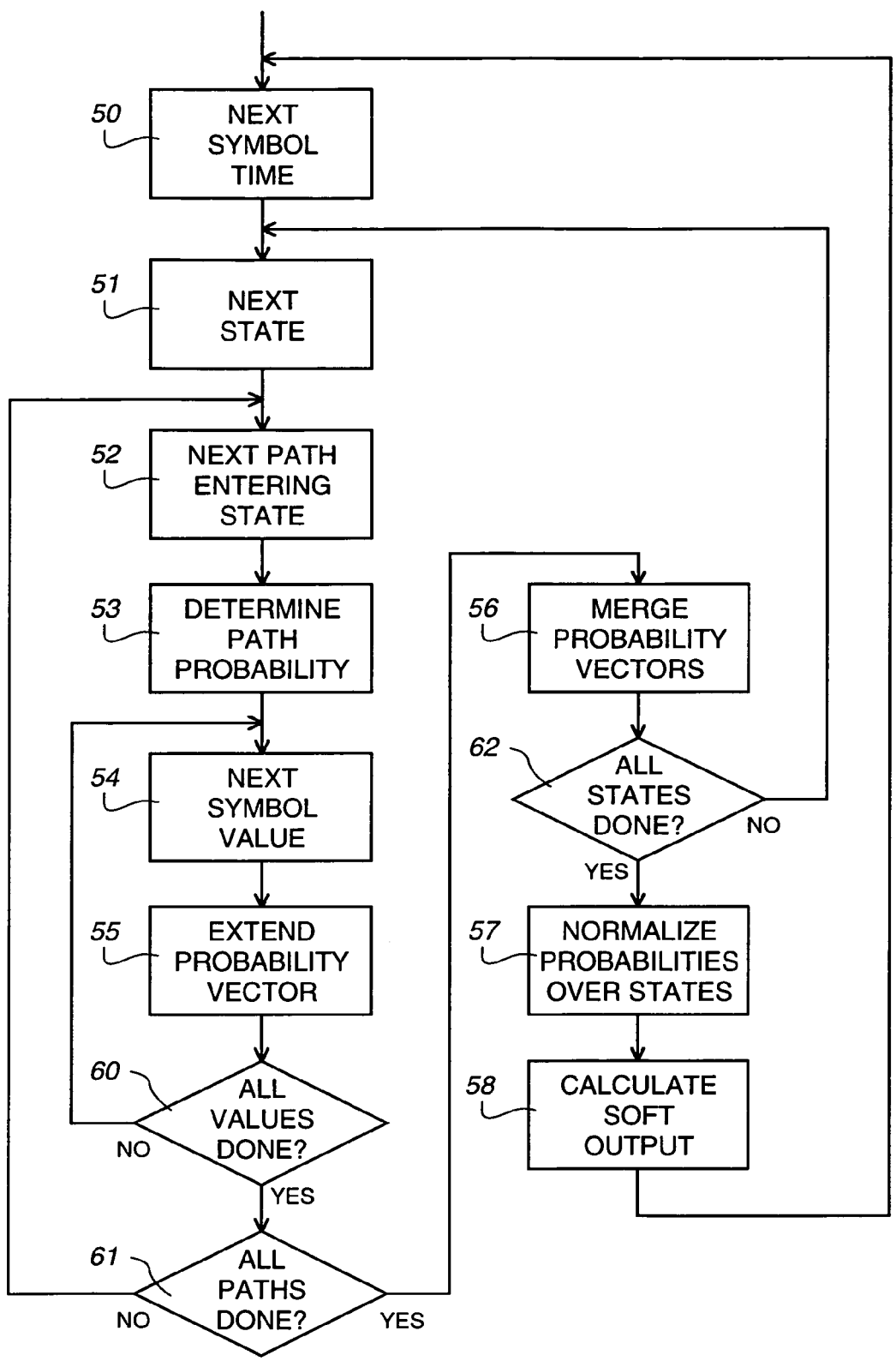
FIG. 4 is a flow chart illustrating an embodiment of the invention.

FIG. 4 illustrates this in the form of a flow chart with blocks 50 to 58 corresponding to the steps indicated above, and additional decision blocks 60 to 62 for providing the looping inherent in the above steps respectively for the successive symbol values for each node or state, paths via which the node or state can be entered, and nodes or states for each symbol time.

It can also be appreciated that, for the case of binary symbols described in detail above, the two probability vectors associated with each node of the decoding trellis can be replaced by a single probability ratio vector, thereby substantially halving the requirements for storage of the vectors. Thus instead of storing individual probabilities $p(u_i=1)$ and $p(u_i=0)$, a probability ratio such as $$\frac{p(u_i=1)}{p(u_i=0)}$$

can be used. However, using probability ratios can introduce some distortion of the probability information, and so may not be preferred from a performance point of view. Ratios of path probabilities can also be used instead of individual path probabilities as described above. Similarly, in the case of q-ary symbols, q−1 probability ratios can be used to reduce storage requirements.

Although the invention has been described above (except for the determination of the soft output) in the linear domain for ease of explanation and understanding, it can be appreciated that, because the probability calculations involve exponential functions, the steps described above are likely to be more easily carried out in the log domain in an equivalent manner, as is known in the art for example in terms of the substantial equivalence of Log-MAP and MAP decoding.

In addition, although the description above refers to decoding of convolutional codes, it can be appreciated that the invention can also be applied to the decoding of other codes, for example block codes instead of convolutional codes, and can be applied to information processes other than decoding, for example to demodulation, equalization, and speech recognition processes. More generally, the invention can be applied to any process where a conventional Viterbi algorithm may be applied or where ML decoding may be useful. In this respect, it is noted that the invention facilitates providing a performance which can be close to that of MAP decoding, and is substantially enhanced over conventional SOVA decoding, with less decoding delay and with potentially less complexity than MAP decoding.

Thus although particular embodiments of the invention have been described in detail, it should be appreciated that the above and numerous other modifications, variations, and adaptations may be made without departing from the scope of the invention as defined in the claims.

The invention claimed is:

1. A method of decoding q-ary encoded information symbols where q is a plural integer, comprising the steps of:
providing, without any backwards computation, for each possible state of a decoding trellis at an information symbol time, q probability vectors for reaching the state via path of δ information symbols of the trellis, and a total probability of reaching the state, an updating the probability vectors and total probability for the each possible state at a next information symbol time by the steps of:
(a) determining a probability for each of q possible transition paths from a state at said information symbol time to the state at said next information symbol time;
(b) determining the total probability of reaching the state at said next information symbol time from the probabilities of the q possible transition paths to said state at said next information symbol time; and
(c) for each q possible encoded information symbol values at the each possible state at said next information symbol time, merging respective the probability vectors for the each possible state at said one information symbol time in accordance with the respective probabilities of the transition paths from the each possible state at said one information symbol time to the state at said next information symbol time; and
(d) determining a probability for an information symbol that is δ information symbols before said next information symbol time from respective elements of the probability vectors for all of possible states at said one information symbol time;
wherein steps (a), (b), (c) and (d) are performed for each and every transition path and steps (b), (c) and (d) are performed for each and every information symbol.

2. A method as claimed in claim 1 wherein each probability vector provides logarithmic probabilities.

3. A method as claimed in claim 1 wherein the q probability vectors for each possible state are represented by q−1 vectors of probability ratios.

4. A method as claimed in claim 3 wherein each probability vector provides logarithmic probability ratios.

5. A method as claimed in claim 3 wherein q=2.

6. A method as claimed in claim 1 wherein q=2.

7. A method as claimed in claim 1 and further including the step of, for each information symbol time, normalizing the total total probability for the each possible state.

8. A method of decoding encoded binary information symbols comprising the steps of:
updating, without any backwards computation, for successive symbol times a vector of logarithmic probability ratios for each state of a decoding trellis at a respective symbol time, each vector of logarithmic probability ratios corresponding to a survivor path through the decoding trellis, each logarithmic probability ratio representing in a logarithmic domain a ratio of the relative probabilities of a symbol representing a binary one or a binary zero, the updating comprising:
(a) determining probabilities for reaching each state via respective transition paths corresponding to binary one and zero values of the information symbols from respective states at a previous symbol time;
(b) combining said determined probabilities to determine a total probability of reaching the state; and
(c) for binary one and zero information symbol values at each state, merging respective probability vectors for respective states at said previous information symbol time in accordance with at least one respective probability of the transition paths from such states of a decoding trellis; and
(d) determining a the probability ratio for the information symbol at a start of the survivor path from elements of at least one vector for all of possible states of the decoding trellis at the respective information symbol time;
wherein steps (a), (b), (c) and (d) are performed for each and every transition path and steps (b), (c) and (d) are performed for each and every information symbol.

9. A method as claimed in claim 8 and further including the step of, for the respective information symbol time, normalizing at least one total probability for all of the possible states.

10. A decoder arranged to carry out a method comprising the steps of:
updating, without any backwards computation, for successive symbol times a vector of logarithmic probability ratios for each state of a decoding trellis at a respective symbol time, each vector of logarithmic probability ratios corresponding to a survivor path through the decoding trellis, each logarithmic probability ratio representing in a logarithmic domain a ratio of the relative probabilities of a symbol representing a binary one or a binary zero, the updating comprising:
(a) determining probabilities for reaching each state via respective transition paths corresponding to binary one and zero values of the information symbols from respective states at a previous symbol time;
(b) combining said determining probabilities to determine a total probability of reaching the state; and
(c) for binary one and zero information symbol values at each state, merging respective probability vectors for respective states at said previous information symbol time in accordance with at least one respective probability of the transition paths from such states of a decoding trellis; and
(d) determining the probability ratio for the information symbol at a start of the survivor path from elements of at least one vector for all of possible states of the decoding trellis at the respective information symbol time;
wherein steps (a), (b), (c) and (d) are performed for each and every transition path and steps (b), (c) and (d) are performed for each and every information symbol.

11. A method of decoding encoded binary information symbols comprising the steps of:

updating, without any backwards computation, for successive symbol times two vectors of logarithmic probabilities for each state of a decoding trellis at a respective symbol time, each vector corresponding to a survivor path through the decoding trellis, each logarithmic probability of the two vectors representing in a logarithmic domain a probability of an information symbol representing a binary one or a binary zero respectively, the updating comprising:

determining probabilities for reaching each state via respective transition paths corresponding to binary one and zero values of the information symbols from respective states at a previous symbol time;

combining said determined probabilities to determine a total probability of reaching the state; and for binary one and zero information symbol values at each state, merging respective probability vectors for respective states at said previous information symbol time in accordance with the respective probabilities of the transition paths from such states; and determining a probability ratio for the information symbol at a start of the survivor path from elements of the vectors for all of possible states of the decoding trellis at the respective information symbol time.

12. A method as claimed in claim 11 and further including the step of, for each symbol time, normalizing the total probability for each state.

13. A decoder arranged to carry out a method comprising the steps of:

updating, without any backwards computation, for successive symbol times two vectors of logarithmic probabilities for each step of a decoding trellis at a respective symbol time, each vector corresponding to a survivor path through the decoding trellis, each logarithmic probability of the two vectors representing in a logarithmic domain a probability of an information symbol representing a binary one or a binary zero respectively, the updating comprising:

determining probabilities for reaching each state via respective transition paths corresponding to binary one and zero values of the information symbols from respective states at a previous symbol time;

combining said determined probabilities to determine a total probability of reaching the state; and for binary one and zero information symbol values a each state, merging respective probability vectors for respective states at said previous information symbol time in accordance with the respective probabilities of the transition paths from such states; and determining a probability ratio for the information symbol at a start of the survivor path from elements of the vectors for all of possible states of the decoding trellis at the respective information symbol time.

* * * * *